(12) United States Patent  (10) Patent No.: US 8,767,138 B2
    Kodera  (45) Date of Patent: Jul. 1, 2014

(54) VACUUM ADSORPTION CONTROL MECHANISM DEVICE, FILM APPLYING DEVICE, AND DISPLAY DEVICE

(75) Inventor: Hideki Kodera, Kanagawa (JP)

(73) Assignee: NLT Technologies, Ltd., Kanagawa (JP)

( * ) Notice: Subject to any disclaimer, the term of this patent is extended or adjusted under 35 U.S.C. 154(b) by 219 days.

(21) Appl. No.: 12/675,858

(22) PCT Filed: Aug. 20, 2008

(86) PCT No.: PCT/JP2008/065226
    § 371 (c)(1),
    (2), (4) Date: Mar. 30, 2010

(87) PCT Pub. No.: WO2009/031440
    PCT Pub. Date: Mar. 12, 2009

(65) Prior Publication Data
    US 2010/0214504 A1    Aug. 26, 2010

(30) Foreign Application Priority Data
    Sep. 4, 2007    (JP) ................................ 2007-229159

(51) Int. Cl.
    *G02F 1/1333*    (2006.01)
(52) U.S. Cl.
    USPC .......................................................... 349/56
(58) Field of Classification Search
    CPC ............................ B32B 37/003; B32B 38/1858
    See application file for complete search history.

(56) References Cited

FOREIGN PATENT DOCUMENTS

| JP | 10-034476 | 2/1998 |
|----|-----------|--------|
| JP | 2001-042315 | 2/2001 |
| JP | 2003-019755 | 1/2003 |
| JP | 2006-159488 | 6/2006 |
| TW | 275838 | 3/2007 |

OTHER PUBLICATIONS

Machine translation of JP 10-034476 A.*
International Search Report, PCT/JP2008/065226, Oct. 21, 2008.
Taiwanese Office Action with Search Report dated Dec. 8, 2011.

* cited by examiner

*Primary Examiner* — Uyen Chau N Le
*Assistant Examiner* — Chris Chu
(74) *Attorney, Agent, or Firm* — Young & Thompson

(57) ABSTRACT

A vacuum suction control mechanism apparatus is capable of accurately bonding a film to a bonding object with a simple structure. The vacuum suction control mechanism apparatus includes a bonding head including a space defined therein, suction holes attracting a film, the suction holes extending from a surface of the bonding head to the space defined in the bonding head, a movable piece partitioning the space into two regions, the movable piece being movable relative to the bonding head within the space in contact with the suction holes, and a connection portion connectable to a decompression source, the connection portion being provided in a first region of the two regions.

21 Claims, 8 Drawing Sheets

VACUUM ADSORPTION CONTROL MECHANISM DEVICE, FILM APPLYING DEVICE, AND DISPLAY DEVICE

BACKGROUND ART

The present invention relates to a vacuum suction control mechanism apparatus, a film bonding apparatus comprising a vacuum suction control mechanism apparatus, and a display apparatus manufactured by a film bonding method.

A display apparatus using liquid crystal or the like is formed by filling liquid crystal or the like between a pair of substrates such as glasses comprising electrodes for display and bonding a polarization film on a surface of one of the substrates.

Apparatuses for bonding a film on a substrate comprise various types of structures. Some apparatuses use a bonding unit (bonding head) comprising suction holes formed in a surface thereof as shown in Patent Document 1.

Specifically, as described at paragraph [0028] of Japanese laid-open patent publication No. 2001-42315 (Patent Document 1), a suction surface of a film support 22, which comprises a curved shape, is formed by a plate comprising a plurality of suction holes defined therein. Suction valves are connected to the suction holes.

As described at paragraph [0037], the film support 22 is rotated and moved toward a supply device A, which supplies a film. The suction valves are switched so as to exhaust air through the suction holes, thereby attracting the film.

After the attraction of the film, the film support 22 is rotated and moved above a substrate (liquid crystal panel). Then the film is bonded to the substrate.

Thereafter, the suction valves are switched so as to supply air, thereby releasing the suction. Thus, the film support 22 is separated from the substrate.

Furthermore, as described at paragraph [0046], air is blown to the film at the time of the bonding in order to prevent a positional deviation when the film is bonded to the substrate.

DISCLOSURE OF INVENTION

However, in a structure thus using vacuum suction to bond a film, suction of a suction hole is controlled with a suction valve. Therefore, it is necessary to provide valves so as to correspond to the number of the suction holes. Thus, the structure is problematically complicated.

Furthermore, a structure for blowing air at the time of attraction or bonding complicates the structure of an apparatus. Moreover, the air blow may cause dust or air to be mixed on a bonding surface. Thus, there is a problem that the bonding accuracy may be lowered.

The present invention has been made in view of the above problems. It is an object of the present invention to provide a vacuum suction control mechanism apparatus capable of accurately bonding a film to a bonding object with a simple structure.

In order to achieve the aforementioned object, a first invention provides a vacuum suction control mechanism apparatus comprising: a bonding head comprising a space defined therein; a plurality of suction holes for attracting a film, the plurality of suction holes extending from a surface of the bonding head to the space defined in the bonding head; a movable piece for partitioning the space into two regions, the movable piece being movable relative to the bonding head within the space in contact with the suction holes; and a connection portion connectable to a decompression source, the connection portion being provided in a first region of the two regions.

A second invention provides a film bonding apparatus comprising the vacuum suction control mechanism apparatus according to the first invention.

A third invention provides a display apparatus manufactured by bonding a film to a bonding object with use of the film bonding apparatus according to the second invention.

A fourth invention provides a film bonding method comprising: using the film bonding apparatus according to the second invention.

EFFECTS OF THE INVENTION

According to the present invention, there can be provided a vacuum suction control mechanism apparatus capable of accurately bonding a film to a bonding object with a simple structure.

DESCRIPTION OF REFERENCE NUMERALS

Figure 1:
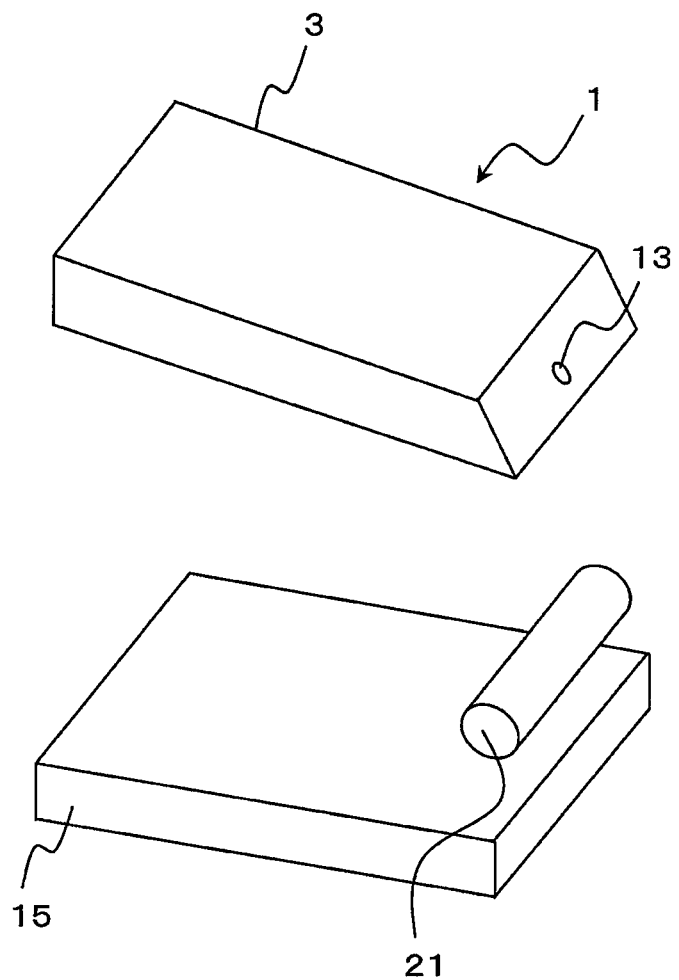
FIG. 1 is a perspective view showing a film bonding apparatus 1.

1 Film bonding apparatus
3 Bonding head
5 Movable piece
9 Suction hole
9a Group of suction holes
11a First region
11b Second region
13 Connection portion 15 Bonding surface plate
15a Upper surface
17 Film
19 Glass substrate
19a Mount
21 Bonding roller
25 Polarization plate
26 Liquid crystal panel
27 Display apparatus

BEST MODE FOR CARRYING OUT THE INVENTION

A preferred embodiment of the present invention will be described below with reference to the drawings.

First, an arrangement of a film bonding apparatus 1 according to an embodiment of the present invention will be described with reference to FIGS. 1 to 4.

Here, the film bonding apparatus 1 is illustrated as an example of a film bonding apparatus for bonding a film of a flexible polarization film to a bonding object of a glass substrate for a liquid crystal display device.

Figure 2:
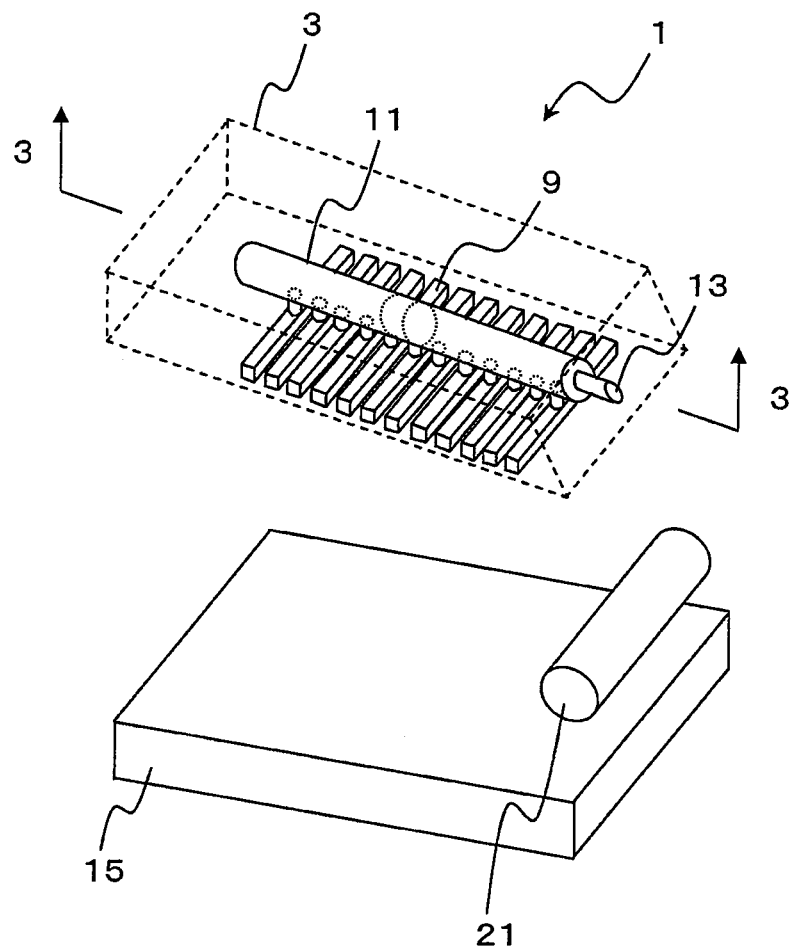
FIG. 2 is a view showing a bonding head 3 with dotted lines in FIG. 1.
Figure 3:
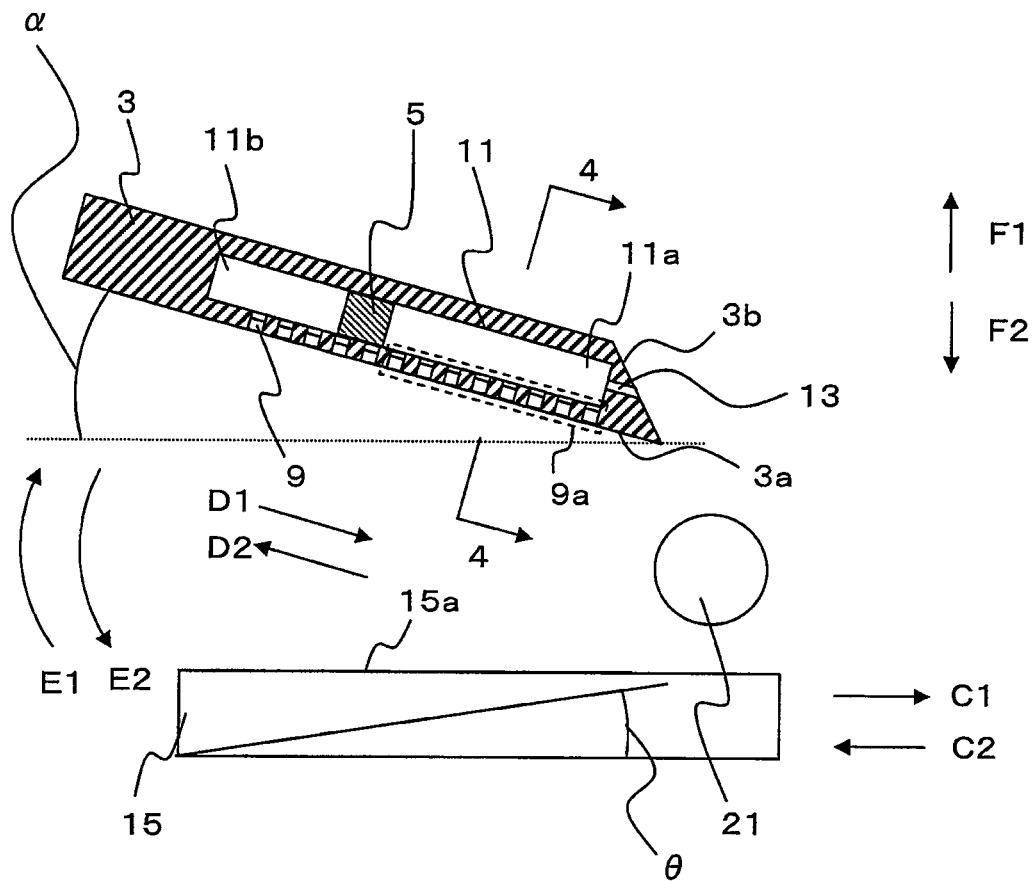
FIG. 3 is a side view of FIG. 2, showing a cross-section of the bonding head 3 taken along line 3-3.

As shown in FIGS. 1 to 3, the film bonding apparatus 1 as a vacuum suction control mechanism apparatus comprises a bonding head 3, a bonding surface plate 15, and a bonding roller 21 as a bonding auxiliary.

Here, the bonding roller 21 is illustrated as an example of a bonding auxiliary. Instead of the bonding roller 21, a squeegee bar may be used. Alternatively, an end of the bonding head 3 may be used as a squeegee, which serves as a bonding auxiliary.

As shown in FIGS. 1 to 3, the film bonding apparatus 1 includes the bonding head 3 in the form of a block for attracting a film 17, which will be described later.

The material of the bonding head 3 is not limited to a specific one. Nevertheless, at least a portion contacting the film 17 is preferably formed of a material comprising elasticity, more preferably rubber or resin comprising a hardness of 20 to 40 by the standard SRIS 0101.

If the bonding head 3 is formed of such a material, bonding pressures are equally generated when the film 17 is bonded onto the glass substrate 19. Therefore, the glass is prevented from being broken because of local concentration of the bonding pressures, and the thickness of the glass substrate 19 can thus be reduced.

Furthermore, since the bonding pressures are equally generated, air bubbles are prevented from being mixed on a bonding surface at the time of bonding. Therefore, low-grade glass comprising poor flatness can be used as a material for the glass substrate 19.

Furthermore, the bonding head 3 is movable in directions C1, C2, F1, and F2 of FIG. 3 by an actuator, which is not shown.

Moreover, the flat bonding surface plate 15 for holding a bonding object is provided so as to face a surface 3a of the bonding head 3.

The bonding surface plate 15 may be movable in the directions C1, C2, F1, and F2 of FIG. 3. Furthermore, the bonding surface plate 15 may comprise a structure for adjusting a θ-direction to adjust the horizontality of the bonding surface plate.

The material of the bonding surface plate 15 is not limited to a specific one. Nevertheless, the bonding surface plate 15 is preferably formed of a material comprising elasticity, more preferably rubber or resin comprising a hardness of 20 to 40 by the standard SRIS 0101, as with the bonding head 3.

If the bonding surface plate 15 is formed of such a material, it is possible to attain the same advantages as in the case where the bonding head 3 is formed of such a material.

Furthermore, the cylindrical bonding roller 21 for press the film 17 at the time of bonding is provided so as to face an upper surface 15a of the bonding surface plate 15.

The bonding roller 21 may be rotatable and may be movable in the directions C1, C2, F1, and F2 of FIG. 3.

Next, the detailed structure of the bonding head 3 will be described with reference to FIGS. 2 to 4.

Figure 4:
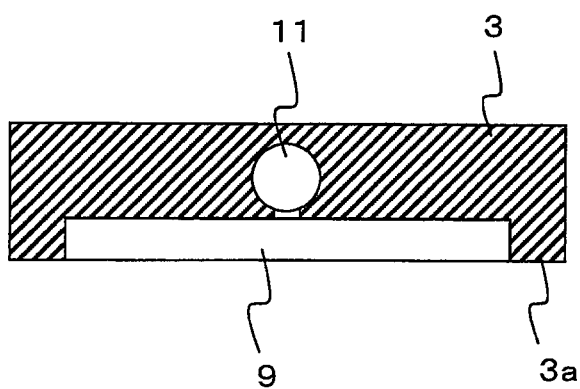
FIG. 4 is a cross-sectional view of the bonding head 3 taken along line 4-4 of FIG. 3.

As shown in FIGS. 2 to 4, a space 11 is formed inside of the bonding head 3.

A plurality of suction holes 9 are formed in the surface 3a of the bonding head 3 so as to extend from the surface 3a to the space 11.

A movable piece 5 is provided within the space 11.

The movable piece 5 is provided so as to partition the space 11 into a first region 11a and a second region 11b. The movable piece 5 is movable in contact with the suction holes 9 along directions D1 and D2 of FIG. 3.

Furthermore, the bonding head 3 comprises a connection portion 13 extending from an inner wall of the first region 11a to a side surface 3b of the bonding head 3.

A decompression source such as a vacuum pump, which is not shown, is connected to the connection portion 13.

Among a plurality of suction holes 9, as shown in FIG. 3, a group 9a of suction holes that communicate with the first region 11a is connected to the connection portion 13 through the first region 11a and thus connected to the decompression source.

If the decompression source is operated in this state, air in the group 9a of the suction holes is exhausted so that the bonding head 3 can attract a film 17.

Meanwhile, since communications of the suction holes other than the group 9a, specifically, the suction holes that communicate with the second region 11b or contact the movable piece 5, with the connection portion 13 are cut off by the movable piece 5, those suction holes are not connected to the decompression source.

In this state, air in those suction holes 9 is not exhausted. Therefore, those suction holes 9 cannot attract the film 17. Accordingly, if the suction holes 9 have already attracted the film 17, the film 17 is separated from those suction holes 9.

Thus, the film bonding apparatus 1 connects the suction holes that communicate with the first region 11a to the decompression source.

The bonding head 3 is provided such that a predetermined angle of inclination α is formed between the surface 3a and the upper surface 15a of the bonding surface plate 15. Furthermore, the bonding head 3 is movable in directions E1 and E2. The angle of inclination α can be changed by this movement.

Next, a method bonding the film 17 onto the glass substrate 19 with use of the film bonding apparatus 1 will be described with reference to FIGS. 5A to 8B.

Bonding of the film 17 onto the glass substrate 19 with the film bonding apparatus 1 requires a process of attracting the film 17 to the bonding head 3 and a process of bonding the film 17 on the bonding head 3 to the glass substrate 19.

First, the process of attracting the film 17 to the bonding head 3 will be described with reference to FIGS. 5A to 6B.

Figure 5A:
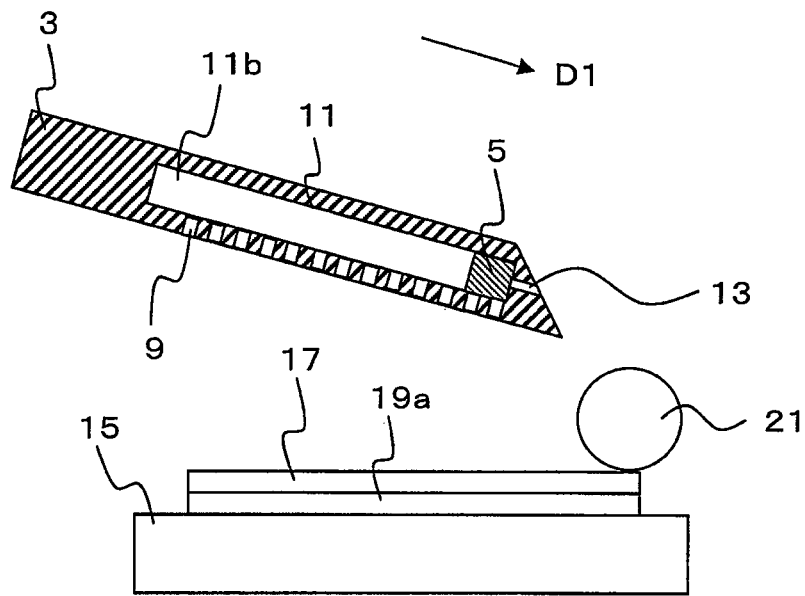
FIG. 5A is a view showing a method attracting a film 17 to the bonding head 3 with use of the film bonding apparatus 1.

As shown in FIG. 5A, the film 17 is first placed and fixed on the bonding surface plate 15.

The film 17 has been bonded to a mount 19a. An adhesive layer, which is not shown, is provided on a surface of the film 17 that contacts the mount 19a.

Available known member can be used for fixing the film 17. For example, the film 17 is fixed by vacuum suction or a clamp.

Then the movable piece 5 of the bonding head 3 is moved toward direction D1 of FIG. 5A so that all of the suction holes 9 communicate with the second region 11b or contact the movable piece 5.

The bonding head 3, rather than the movable piece 5, may be moved because the movable piece 5 should only be moved relative to the bonding head 3.

Thus, all of the suction holes 9 lose a suction force.

Figure 5B:
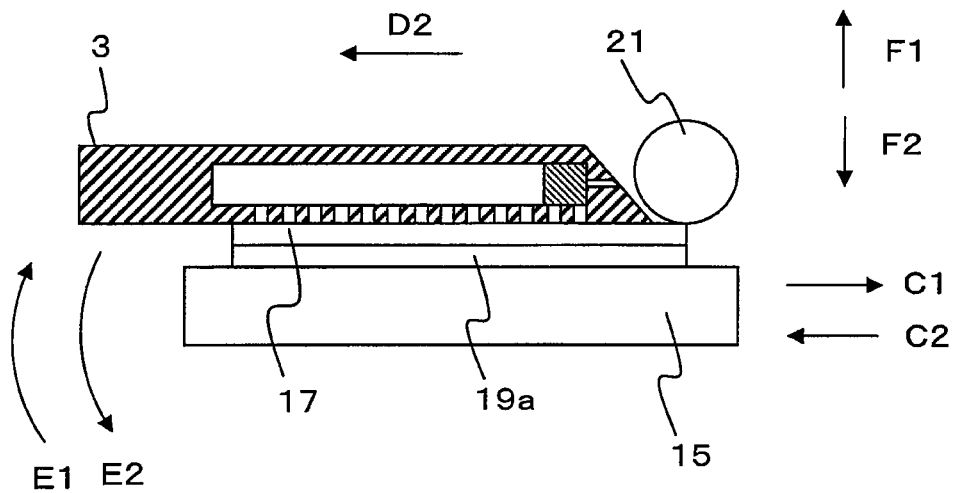
FIG. 5B is a view showing a method attracting the film 17 to the bonding head 3 with use of the film bonding apparatus 1.

Next, the bonding head 3 or the bonding surface plate 15 is moved in the direction C1, C2, F1, or F2 of FIG. 3 in this state. Furthermore, the bonding head 3 is moved toward the direction E2. Thus, as shown in FIG. 5B, all of the suction holes 9 are brought into contact with a surface of the film 17. Then the decompression source, which is not shown, is operated.

When the suction holes 9 are brought into contact with the surface of the film 17, an end of the film 17 slightly extends from the right end of the bonding head 3. This arrangement is made in order to apply a tension to the bonding roller 21 at the time of bonding.

During the movement, the position of the film 17 is measured by a sensor, a camera, or the like, which is not shown. Based on the measured position, an actuator, which is not shown, is operated to move the bonding head 3 or the bonding surface plate 15.

Then the movable piece 5 is moved toward the direction D2 from the state of FIG. 5B.

The suction holes 9 are sequentially brought into communication with the first region 11a from the rightmost suction hole in FIG. 5B. The suction holes 9 are connected to the decompression source in the order in which they have communicated with the first region 11a. Sequentially, air is exhausted, so that the suction holes 9 attract the film 17.

The bonding head 3 and the bonding surface plate 15, rather than the movable piece 5, may be moved.

Figure 6A:
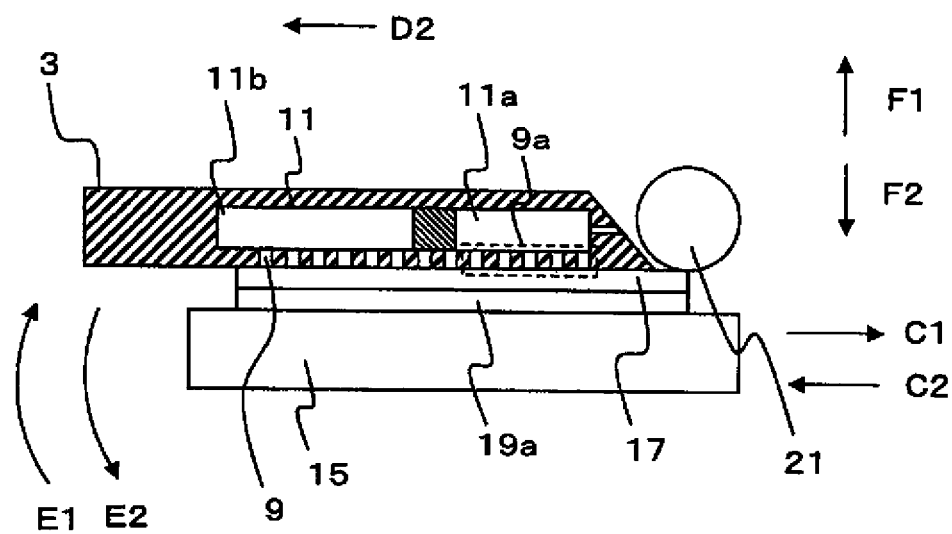
FIG. 6A is a view showing a method attracting the film 17 to the bonding head 3 with use of the film bonding apparatus 1.

For example, FIG. 6A shows the attraction in progress. The group 9a of the suction holes that communicate with the first region 11a is connected to the connection portion 13 through the first region 11a and thus connected to the decompression source. Air in the group 9a of the suction holes is drawn, so that the group 9a of the suction holes attracts the film 17.

The suction force depends upon the surface roughness and the flexibility of the film 17. In the case of a polarization film for a liquid crystal panel as in the present embodiment, it is preferable to adjust a suction force in a range of about $2.0 \times 10^4$ Pa to about $4.9 \times 10^4$ Pa.

Figure 6B:
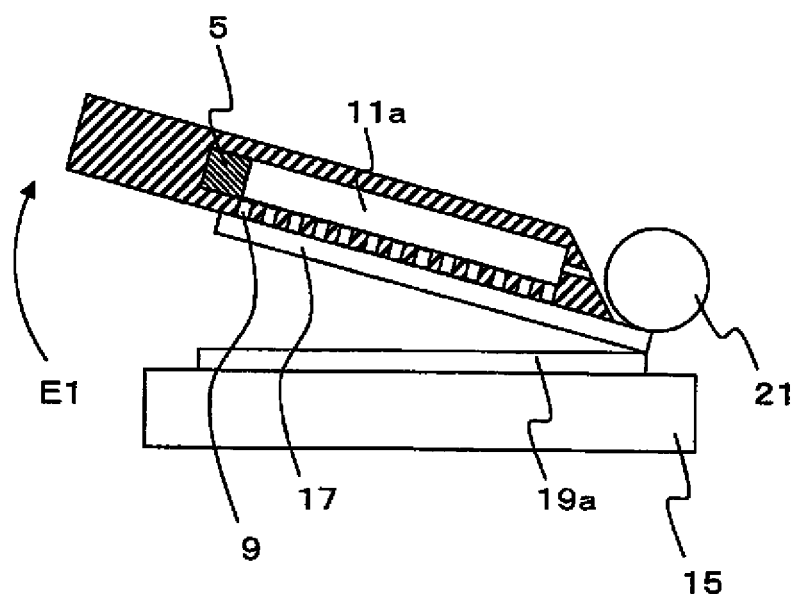
FIG. 6B is a view showing a method attracting the film 17 to the bonding head 3 with use of the film bonding apparatus 1.

As shown in FIG. 6B, when the movable piece 5 is moved to the left end so that all of the suction holes 9 communicate with the first region 11a, the bonding head 3 is inclined toward the direction E1 of FIG. 3 to the original angle of inclination α (see FIG. 3). The bonding head 3 or the bonding surface plate 15 is moved in the directions C1, C2, F1, and F2 of FIG. 3 so as to separate the bonding head 3 from the bonding surface plate 15.

Thus, when the film bonding apparatus 1 is to attract the film 17, the suction holes are connected to the decompression source in the order in which they have communicated with the first region 11a, thereby attracting the film 17.

Therefore, the film 17 can be attracted with accuracy without deviation of the film 17 at the time of attraction.

Next, a process of bonding the attracted film 17 onto the glass substrate 19 will be described with reference to FIGS. 7A to 8B.

Figure 7A:
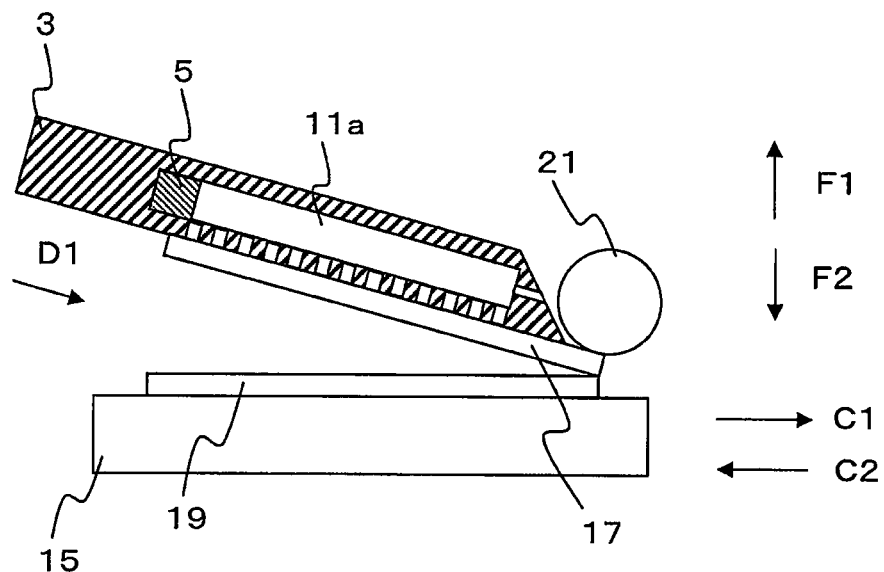
FIG. 7A is a view showing a method bonding the film 17 onto a glass substrate 19 with use of the film bonding apparatus 1.

First, as shown in FIG. 7A, the glass substrate 19 is fixed on the bonding surface plate 15. The same fixing member fixing the film 17 may be used.

Next, the bonding head 3 that has attracted the film 17 or the bonding surface plate 15 is moved in the directions C1, C2, F1, and F2 of FIG. 3 so that the right end of the film 17 is brought into contact with a desired location of the glass substrate 19.

Furthermore, the right end of the film 17 is pressed by the bonding roller 21.

For alignment with the desired location, the desired location of the glass substrate 19 is measured by a sensor, a camera, or the like, which is not shown. Based on the measured location, an actuator, which is not shown, is operated to move the bonding head 3 or the bonding surface plate 15.

Then the bonding surface plate 15 is moved toward the direction C1. Furthermore, the movable piece 5 is moved toward the direction D1 of FIG. 7A in synchronism with the movement of the bonding surface plate 15.

The bonding head 3 and the bonding roller 21 are not moved.

The film 17 is bonded to the glass substrate 19 from its right end by the pressure of the bonding roller 21. At that time, communications of the suction holes 9 with the first region 11a are sequentially cut off from the leftmost suction hole, and those suction holes 9 lose a suction force.

Therefore, while the film 17 moves on the surface of the bonding head 3 toward the direction D1 with maintaining a tension in a state such that the film 17 has been attracted to the surface of the bonding head 3, the film 17 is bonded to the glass substrate 19.

Figure 7B:
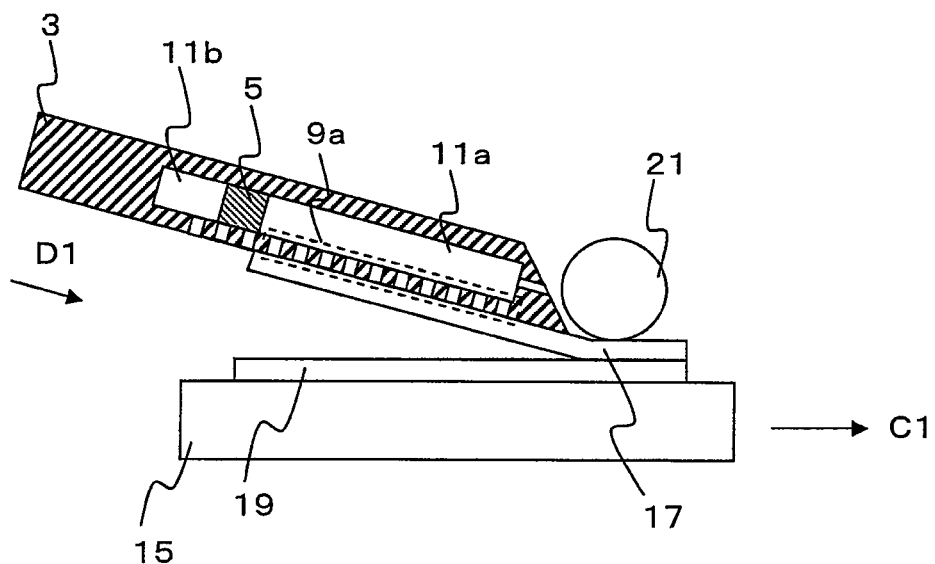
FIG. 7B is a view showing a method bonding the film 17 onto the glass substrate 19 with use of the film bonding apparatus 1.
Figure 8A:
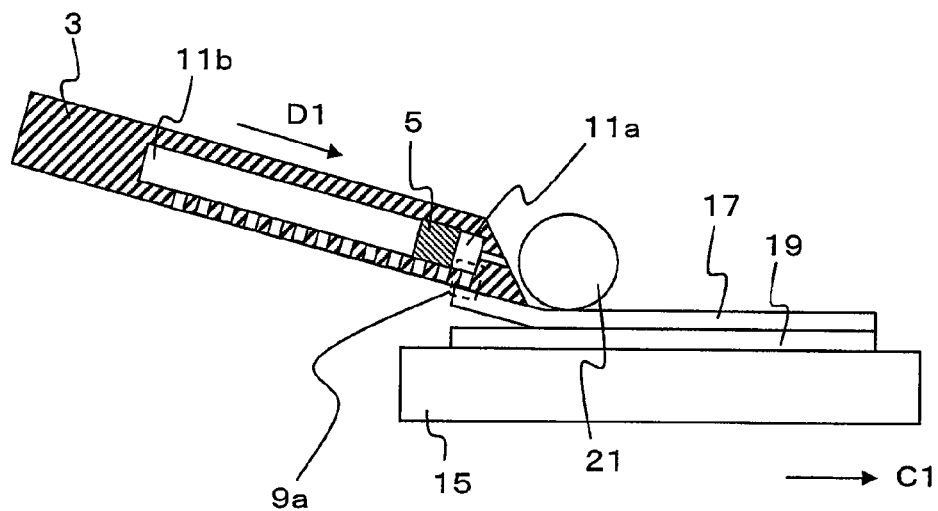
FIG. 8A is a view showing a method bonding the film 17 onto the glass substrate 19 with use of the film bonding apparatus 1.

For example, FIGS. 7B and 8A show the bonding in progress. A group 9a of the suction holes that has communicated with the first region 11a is connected to the connection portion 13 through the first region 11a, so that those suction holes attract the film 17.

Figure 8B:
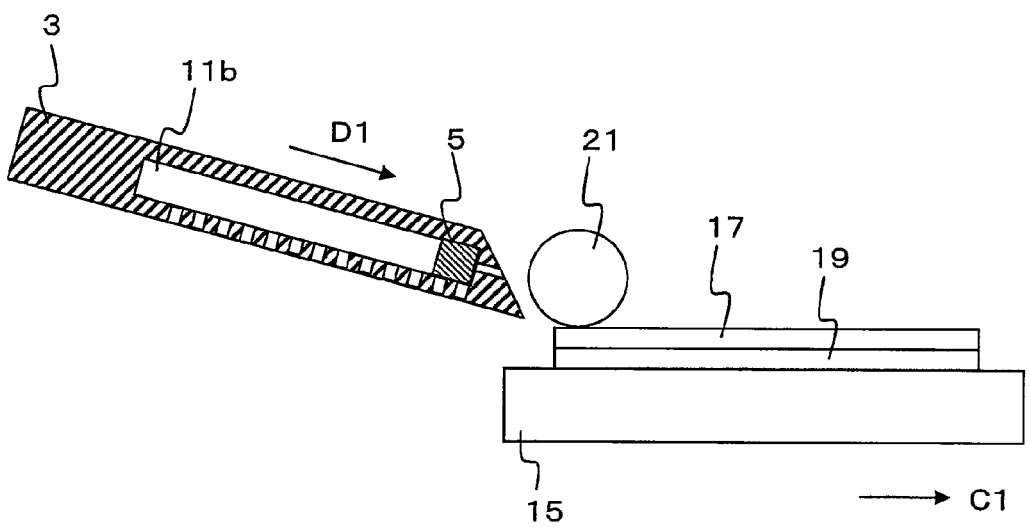
FIG. 8B is a view showing a method bonding the film 17 onto the glass substrate 19 with use of the film bonding apparatus 1.

As shown in FIG. 8B, when the bonding of the film 17 is completed, the movement of the bonding surface plate 15 is stopped.

Thus, the film 17 is bonded to the glass substrate 19, and a liquid crystal panel is completed.

Figure 9:
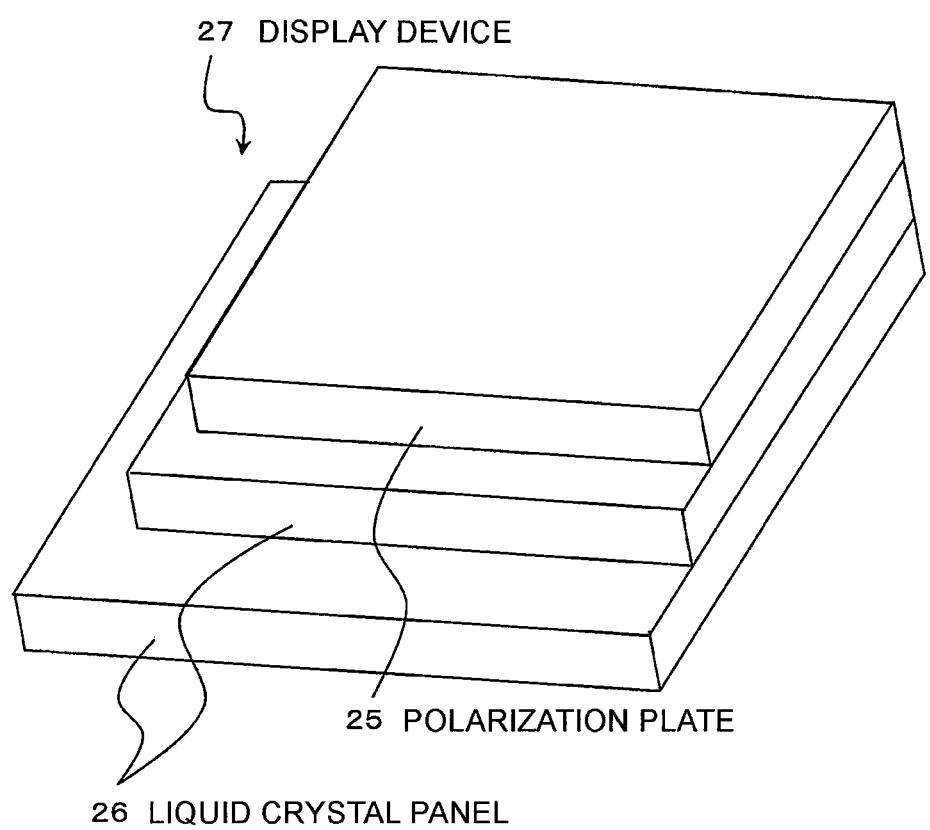
FIG. 9 is a view showing a display apparatus manufactured by bonding a polarization plate to liquid crystal panels with use of the film bonding apparatus 1.

For reference purposes, FIG. 9 shows a display apparatus 27 manufactured by bonding a polarization plate to liquid crystal panels with use of the film bonding apparatus 1.

In the display apparatus 27 shown in FIG. 9, a polarization plate 25 is bonded to liquid crystal panels 26 with use of the film bonding apparatus 1.

As described above, when the film 17 is bonded to the glass substrate 19, the movable piece 5 is moved so that the suction holes 9 lose a suction force sequentially from the leftmost suction hole. The film 17 is bonded to the glass substrate 19 while it moves on the surface of the bonding head 3 toward the direction D1 in a state such that the film 17 has been attracted to the surface 3a of the bonding head 3.

Therefore, deviation of the film 17 or mixing of air or dust is prevented during the bonding. Accordingly, the film 17 can be bonded with accuracy.

Thus, according to the present embodiment, the film bonding apparatus 1 includes a bonding head 3 comprising a plurality of suction holes and a space 11 defined therein and a movable piece 5 for partitioning the space 11 into two regions. The suction holes 9 that communicate with a first region 11a are connected to or disconnected from a decompression source.

Therefore, the film bonding apparatus 1 does not require a plurality of valves for suction control. Thus, the film bonding apparatus 1 comprises a simple structure.

Furthermore, no air needs to be blown. Therefore, deviation of the film 17 or mixing of air or dust is prevented during the bonding. Accordingly, the film 17 can be bonded with accuracy.

Moreover, when the film bonding apparatus 1 is used to bond the film 17 onto the glass substrate 19 for manufacturing a display apparatus, the quality of the manufactured display apparatus can be improved.

EXAMPLE

The present invention will specifically be described below based on an example.

In an example of the present invention, a film bonding apparatus 1 shown in FIG. 1 was prepared. A polarization film was bonded to a glass substrate 19 comprising a diagonal of 2 inches to 60 inches.

The polarization film used for bonding had a surface roughness such that 0.3 μm≤Ra ≤3.0 μm. The thickness of the polarization film was in a range of from 0.1 mm to 0.5 mm.

Furthermore, a suction force of each suction hole at the time of a bonding was set in a range of from about $2.0 \times 10^4$ Pa to about $4.9 \times 10^4$ Pa.

As a result, it was confirmed that the polarization film did not fall off from the bonding head 3 during the bonding and that there is no trouble in the slide of the polarization film at the time of the bonding.

In the aforementioned embodiment, the present invention is applied to an apparatus for bonding a polarization film to a liquid crystal display substrate. However, the present invention is not limited to that example and is applicable to any apparatus for bonding a film to a bonding object.

Specifically, according to another embodiment of the vacuum suction control mechanism apparatus of the present invention, the movable piece may be movable relative to the bonding head at the time of bonding.

According to still another embodiment of the vacuum suction control mechanism apparatus of the present invention, the bonding head may be movable relative to the movable piece at the time of bonding.

According to another embodiment of the vacuum suction control mechanism apparatus of the present invention, the vacuum suction control mechanism may further comprise a bonding surface plate for holding a bonding object, and a relative position between the bonding head and the bonding surface plate can be changed.

According to still another embodiment of the vacuum suction control mechanism apparatus of the present invention, the relative position may be changed by movement of the bonding head or the bonding surface plate.

According to another embodiment of the vacuum suction control mechanism apparatus of the present invention, the bonding head and/or the bonding surface plate may comprise elasticity.

According to still another embodiment of the vacuum suction control mechanism apparatus of the present invention, the vacuum suction control mechanism apparatus may further comprise an auxiliary provided so as to face the bonding surface plate for pressing the film at the time of bonding.

According to another embodiment of the vacuum suction control mechanism apparatus of the present invention, the auxiliary may comprise a rotatable bonding roller or a squeegee bar.

Furthermore, according to another embodiment of the display apparatus of the present invention, the film may comprise flexibility.

According to still another embodiment of the display apparatus of the present invention, the film may be an optical film, and the bonding object may be a substrate that allows visible light to pass therethrough.

According to another embodiment of the display apparatus of the present invention, the optical film may be a polarization film, and the display apparatus may be a liquid crystal display apparatus.

According to sill another embodiment of the display apparatus of the present invention, the bonding object may be formed of glass.

In the aforementioned embodiment, the vacuum suction control mechanism apparatus comprises a movable piece for partitioning a space defined in the bonding head into two regions. Only the suction holes that communicate with a first region, which is one of the regions partitioned by the movable piece, comprise a suction force.

Accordingly, at the time of bonding of a film, attraction can be controlled merely by movement of the movable piece. Thus, a film can accurately be bonded to a bonding object with a simple structure without deviation of the film or mixing of dust or air.

Furthermore, since a display apparatus according to an embodiment of the present invention is manufactured by using a vacuum suction control mechanism apparatus according to the present invention, the quality of the display apparatus can be improved.

This application claims the benefit of priority from Japanese patent application No. 2007-229159, filed on Sep. 4, 2007, the disclosure of which is incorporated herein in its entirety by reference.

The invention claimed is:

1. A vacuum suction control mechanism apparatus comprising:
   a bonding head comprising a space to be decompressed defined therein;
   a plurality of suction holes attracting a film when the space is decompressed, the plurality of suction holes extending from a surface of the bonding head to the space defined in the bonding head;
   a movable piece partitioning the space into two sealed chambers being a decompressed chamber and a non-decompressed chamber, the movable piece being movable relative to the bonding head within the space in contact with the suction holes; and
   a connection portion connectable to a decompression source, the connection portion being provided only in a first region of the two sealed chambers which is the decompressed chamber,
   wherein, in the plurality of suction holes, the suction holes provided in the first region attach film, and the movable piece controls a size of the first region and thereby controls a number of suction holes provided in the first region.

2. The vacuum suction control mechanism apparatus as recited in claim 1, wherein the movable piece is movable relative to the bonding head at the time of bonding.

3. A film bonding apparatus comprising the vacuum suction control mechanism apparatus as recited in claim 2.

4. The vacuum suction control mechanism apparatus as recited in claim 1, wherein the bonding head is movable relative to the movable piece at the time of bonding.

5. The vacuum suction control mechanism apparatus as recited in claim 3, further comprising a bonding surface plate holding a bonding object,
   wherein a relative position between the bonding head and the bonding surface plate can be changed.

6. The vacuum suction control mechanism apparatus as recited in claim 5, wherein the relative position is changed by movement of the bonding head or the bonding surface plate.

7. A film bonding apparatus comprising the vacuum suction control mechanism apparatus as recited in claim 6.

8. The vacuum suction control mechanism apparatus as recited in claim 5, wherein the bonding head and/or the bonding surface plate has elasticity.

9. A film bonding apparatus comprising the vacuum suction control mechanism apparatus as recited in claim 8.

10. The vacuum suction control mechanism apparatus as recited in claim 5, further comprising an auxiliary provided so as to face the bonding surface plate for pressing the film at the time of bonding.

11. The vacuum suction control mechanism apparatus as recited in claim 10, wherein the auxiliary comprises a rotatable bonding roller or a squeegee bar.

12. A film bonding apparatus comprising the vacuum suction control mechanism apparatus as recited in claim 4.

13. A film bonding apparatus comprising the vacuum suction control mechanism apparatus as recited in claim 5.

14. A film bonding apparatus comprising the vacuum suction control mechanism apparatus as recited in claim 1.

15. A display apparatus manufactured by bonding a film to a bonding object with use of the film bonding apparatus as recited in claim 14.

16. The display apparatus as recited in claim 15, wherein the film has flexibility.

17. The display apparatus as recited in claim 15, wherein:
the film is an optical film, and
the bonding object is a substrate that allows visible light to pass therethrough.

18. The display apparatus as recited in claim 17, wherein the optical film is a polarization film, and the display apparatus is a liquid crystal display apparatus.

19. The display apparatus as recited in claim 17, wherein the bonding object is formed of glass.

20. A film bonding method comprising: using the film bonding apparatus as recited in claim 14.

21. A vacuum suction control mechanism apparatus comprising:
a bonding head comprising a space defined therein;
a plurality of suction holes attracting a film, the plurality of suction holes extending from a surface of the bonding head to the space to be decompressed defined in the bonding head;
a movable piece comprising a movable valve partitioning the space into two sealed chambers being a decompressed chamber and a non-decompressed chamber, the movable piece being movable relative to the bonding head within the space in contact with the suction holes; and
a connection portion connectable to a decompression source, the connection portion being provided only in a first region of the two sealed chambers which is the decompressed chamber,
wherein, in the plurality of suction holes, the suction holes provided in the first region attach film, and the movable piece controls a size of the first region and thereby controls a number of suction holes provided in the first region.

* * * * *